United States Patent
Day et al.

(10) Patent No.: US 6,321,342 B1
(45) Date of Patent: Nov. 20, 2001

(54) METHOD AND APPARATUS FOR INTERFACING CIRCUITS THAT OPERATE BASED UPON DIFFERENT CLOCK SIGNALS

(75) Inventors: Brian A. Day; Timothy E. Hoglund, both of Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/274,566

(22) Filed: Mar. 23, 1999

(51) Int. Cl.⁷ ....................................................... G06F 1/10
(52) U.S. Cl. .............................. 713/600; 710/58; 713/501
(58) Field of Search ................................... 713/501, 600; 326/93, 96; 710/58, 60

(56) References Cited

U.S. PATENT DOCUMENTS

| | | | | |
|---|---|---|---|---|
| 3,980,993 | * | 9/1976 | Bredart et al. ......................... | 713/501 |
| 4,818,164 | | 4/1989 | Branson .................................. | 364/100 |
| 5,442,774 | | 8/1995 | Pickup et al. ........................... | 395/550 |
| 5,448,715 | * | 9/1995 | Lelm et al. ............................. | 713/600 |
| 5,530,906 | | 6/1996 | Cho et al. ............................... | 395/881 |
| 5,585,750 | | 12/1996 | Noguchi et al. ........................ | 327/113 |
| 5,640,573 | | 6/1997 | Gephardt et al. ...................... | 395/750 |
| 5,680,594 | | 10/1997 | Charneski et al. ..................... | 395/556 |
| 5,686,845 | | 11/1997 | Erdal et al. ............................. | 326/93 |
| 5,744,991 | | 4/1998 | Jefferson et al. ....................... | 327/158 |
| 5,818,263 | | 10/1998 | Ashuri .................................... | 326/93 |
| 5,909,563 | * | 6/1999 | Jacobs ..................................... | 710/129 |
| 5,974,560 | * | 10/1999 | Hotta et al. ............................ | 713/500 |

* cited by examiner

Primary Examiner—Thomas M. Heckler (57) ABSTRACT

A method of interfacing a third circuit with a first circuit that operates based upon a first clock signal and a second circuit that operates based upon a second clock signal includes the step of applying the first clock signal and the second clock signal to a clock selector for the third circuit. The method further includes the step of transferring first data signals between the third circuit and the first circuit at a first rate based upon the first clock signal. Another step of the method includes causing the clock selector to apply the first clock signal to the third circuit prior to the step of transferring the first data signals between the third circuit and the first circuit. Yet another step of the method includes transferring second data signals between the third circuit and the second circuit at a second rate based upon the second clock signal. Furthermore, the method includes causing the clock selector to apply the second clock signal to the third circuit prior to the step of transferring the second data signals between the third circuit and the second circuit. Various apparatus for implementing the method are also disclosed.

20 Claims, 4 Drawing Sheets

METHOD AND APPARATUS FOR INTERFACING CIRCUITS THAT OPERATE BASED UPON DIFFERENT CLOCK SIGNALS

BACKGROUND OF THE INVENTION

The present invention relates generally to interfacing a circuit with another circuit, and more particularly to interfacing a circuit with other circuits operating at different frequencies.

With the growing trend toward IP reuse via core-based design styles, managing clock domains becomes an increasing challenge. Quite often, the different IP cores in a design operate on different clock domains, and interfacing these cores together can require additional synchronization adding to the complexity of the design, and possibly reducing performance.

For example, a RAID SCSI host adapter commonly utilizes more than one clock domain. A RAID SCSI host adapter essentially provides an interface between a computer system and a RAID storage device. Moreover, a RAID SCSI host adapter is commonly implemented as an expansion card which may be inserted into an expansion slot of a computer system.

Commonly the expansion slot of a computer system provides expansion boards access to the system bus of the computer system. A common system bus in present computer systems is the PCI Local Bus. The PCI Local Bus Specification, Rev. 2.1 defines protocol, electrical, mechanical, and configuration specifications for PCI Local Bus components and expansion boards. One such requirement is that the PCI Local Bus be implemented as a synchronous bus which operates based upon a 33 MHz clock signal or a 66 MHz clock signal. Due to these requirements, the PCI Local Bus Specification forces expansion boards such as a RAID SCSI host adapter to include PCI interface circuitry that operates based upon the same 33 MHz or 66 MHz clock signal provided by the PCI Local Bus.

Besides PCI interface circuitry that operates based upon a 33 MHz clock signal, a RAID SCSI host adapter typically also includes a SCSI controller integrated circuit device (i.e. a SCSI control chip), a DRAM (dynamic random access memory) controller, and on-board DRAM. The DRAM controller and on-board DRAM typically must operate based upon a clock signal having a frequency for which the DRAM controller and DRAM were designed. More specifically, if the DRAM controller and DRAM are designed to be operated based upon a 40 MHz clock, then the DRAM controller and DRAM must be operate based upon a 40 MHz clock signal. Operating the DRAM controller and DRAM based upon a faster clock signal such as a 66 MHz clock signal would likely violate setup-and-hold times and/or signal propagation times of the DRAM controller and DRAM, thus resulting in data integrity errors and sporadic behavior. Similarly, operating the DRAM controller and DRAM based upon a slower clock signal such as a 33 MHz clock signal would cause the refresh circuitry of the DRAM controller to refresh the DRAM contents at a slower rate than the DRAM was designed. As a result of refreshing the DRAM at a slower rate, data integrity errors are likely to occur due to stored charges leaking faster than the refresh circuitry of the DRAM controller can recharge them. Accordingly, the RAID SCSI host adapter typically includes an on-board oscillator or other mechanism for providing the DRAM controller and DRAM with a clock signal having an appropriate frequency such as 40 MHz.

During operation of the RAID SCSI host adapter, the SCSI control chip must access the PCI bus via the PCI interface circuitry and the DRAM via the DRAM controller. Since the PCI interface circuitry operates based upon a first clock signal having a frequency of 33 MHz and the DRAM controller operates based upon a second clock signal having a frequency of 40 MHz, the RAID SCSI host adapter must include circuitry that properly interfaces the SCSI control chip with the PCI interface circuitry and the DRAM controller.

Figure 1:
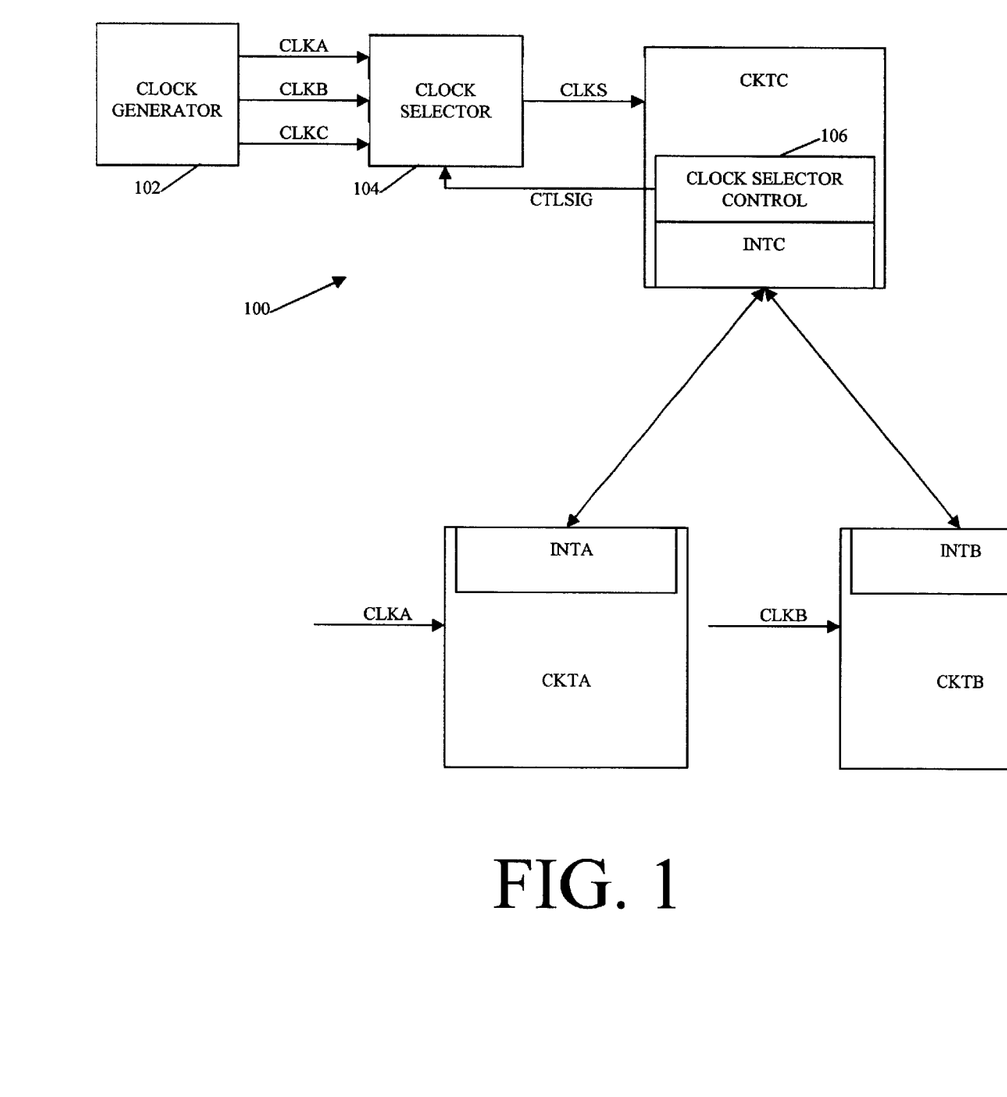
FIG. 1 shows block diagram of first interface circuitry which incorporates features of the present invention.

One such scheme for interfacing a circuit such as the SCSI control chip with two circuits operating based upon clock signals having different frequencies is taught by Charneski et al. (U.S. Pat. No. 5,680,594). Charneski teaches the use of an ASIC bus interface 20 for interfacing a first circuit such as a microprocessor with a first subsystem 22 and a second subsystem 24 that are operating based upon different clock signals. While this scheme is sufficient in many environments it suffers from several short comings. As illustrated in FIG. 1, the ASIC bus interface 20 includes a separate synchronizing state machine 12, 14, 16, 18 for each different clock signal. This results in a rather large die size for the ASIC bus interface 20 if several different clock signals are required because the ASIC bus interface 20 must include a separate synchronizing state machine 12, 14, 16, 18 for each different clock signal.

Moreover, the ASIC bus interface 20 introduces an additional layer of circuitry between the microprocessor and the subsystems 22, 24. As a result of this additional layer of circuitry, ASIC bus interface 20 includes additional logic to ensure that a data overflow condition does not occur due to the microprocessor transferring data to a subsystem 22, 24 at a rate faster than the ASIC bus interface 20 can transfer the data to the destined subsystem 22, 24. In particular, the ASIC bus interface 20 includes bus cycle clock logic 19 which generates a bus cycle done signal after the data is transferred to the appropriate subsystem 22, 24. Unless the ASIC bus interface 20 includes substantial buffer memory and additional logic to ensure that a data overflow condition does not occur, the microprocessor must wait until it receives the bus cycle done signal before transferring additional data to the desired subsystem 22, 24. As a result of (i) waiting for the bus cycle done signal, and (ii) the processing required by the ASIC bus interface 20 to generate the bus cycle done signal, the microprocessor is unable to interface the desired subsystem in a synchronous manner thereby inhibiting the microprocessor from transfer data to the desired subsystem during each clock cycle of the clock signal upon which the desired subsystem operates.

What is needed therefore is an interfacing method and apparatus which is operable to provide a circuit with a synchronous interface for interfacing circuits operating based upon different clock signals.

SUMMARY OF THE INVENTION

In accordance with one embodiment of the present invention, there is provided a method of interfacing a first circuit that operates based upon a first clock signal and a second circuit that operates based upon a second clock signal with a third circuit. One step of the method includes transferring first signals between the third circuit and the first circuit. Another step of the method includes operating the third circuit based upon the first clock signal during the step of transferring the first signals between the third circuit and the first circuit. Yet another step of the method includes transferring second signals between the third circuit and the second circuit. The method also includes the step of operating the third circuit based upon the second clock signal during the step of transferring the second signals between the third circuit and the second circuit.

Pursuant to another embodiment of the present invention, there is provided a method of interfacing a first circuit that operates based upon a first clock signal and a second circuit that operates based upon a second clock signal with a third circuit. One step of the method includes applying the first clock signal and the second clock signal to a clock selector for the third circuit. The method further includes the step of transferring first data signals between the third circuit and the first circuit at a first rate based upon the first clock signal. Another step of the method includes causing the clock selector to apply the first clock signal to the third circuit prior to the step of transferring the first data signals between the third circuit and the first circuit. Yet another step of the method includes transferring second data signals between the third circuit and the second circuit at a second rate based upon the second clock signal. Furthermore, the method includes causing the clock selector to apply the second clock signal to the third circuit prior to the step of transferring the second data signals between the third circuit and the second circuit.

Pursuant to yet another embodiment of the present invention, there is provided an apparatus for interfacing a first circuit operating at a first rate based upon a first clock signal and a second circuit operating at a second rate based upon a second clock signal with a third circuit that is configured to operate at (i) the first rate in response to receiving the first clock signal, and (ii) the second rate in response to receiving the second clock signal. The apparatus includes a clock selector and a clock selector control coupled to the clock selector. The clock selector is operable to receive the first clock signal, the second clock signal, first control signals, and second control signals. Moreover, the clock selector is operable to apply the first clock signal to the third circuit in response to the first control signals in order to cause the third circuit to operate at the first rate. The clock selector is also operable to apply the second clock signal to the third circuit in response to the second control signals in order to cause the third circuit to operate at the second rate. The clock selector control is operable to generate the first control signals prior to a first data transfer between the third circuit and the first circuit. Moreover, the clock selector control is operable to generate the second control signals prior to a second data transfer between the third circuit and the second circuit.

Pursuant to a further embodiment of the present invention, there is provided a system that includes a first clock source, a second clock source, a first circuit, a second circuit, a third circuit, a clock selector, and a clock selector control. The first clock source is operable to generate a first clock signal, and the second clock source is operable to generate a second clock signal. The first circuit is coupled to the first clock source in order to receive the first clock signal and is configured to operate at a first rate based upon the first clock signal. The second circuit is coupled to the second clock source in order to receive the second clock signal and is configured to operate at a second rate that is based upon the second clock signal. The third circuit is coupled to the first circuit and the second circuit and is configured to (i) operate at the first rate in response to receiving the first clock signal, and (ii) operate at the second rata in response to receiving the second clock signal.

The clock selector is coupled to (i) the first clock generator in order to receive the first clock signal, and (ii) the second clock generator in order to receive the second clock signal. Moreover, the clock selector is operable to apply the first clock signal to the third circuit in response to first control signals in order to cause the third circuit to operate at the first rate. Furthermore, the clock selector is operable to apply the second clock signal to the third circuit in response to second control signals in order to cause the third circuit to operate at the second rate.

The clock selector control is coupled to the clock selector and is operable to generate the first control signals prior to a first data transfer between the third circuit and the first circuit. Furthermore, the clock selector control is operable to generate the second control signals prior to a second data transfer between the third circuit and the second circuit.

It is an object of the present invention to provide a new and useful method and apparatus for interfacing integrated circuits.

It is also an object of the present invention to provide an improved method and apparatus for interfacing integrated circuits.

It is another object of the present invention to provide a method and apparatus for interfacing circuits that operate based upon different clock signals with another circuit.

It is yet another object of the present invention to provide a method and apparatus for synchronously interfacing circuits that operate based upon different clock signals with another circuit.

It is a further object of the present invention to provide a method and apparatus for interfacing a first circuit with at least two other circuits that operate based upon different clock signals without requiring the first circuit to include a separate interface for each circuit being interfaced.

The above and other objects, features, and advantages of the present invention will become apparent from the following description and the attached drawings.

DETAILED DESCRIPTION OF PREFERRED EMBODIMENTS

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is illustrated first interface circuitry 100 that incorporates features of the present invention. The interface circuitry 100 includes a clock generator 102, a clock selector 104, and a clock selector control 106 which in combination interface a first circuit CKTA and a second circuit CKTB with a third circuit CKTC.

The first circuit CKTA, the second circuit CKTB, and the third circuit CKTC each include synchronous circuitry such as flip-flops, latches, and state machines. Due to the synchronous circuitry, the first circuit CKTA, the second circuit CKTB, and the third circuit CKTC generally operate at a rate which is controlled by a clock signal applied to the respective circuit. More specifically, as illustrated in FIG. 1, the first circuit CKTA includes a first interface INTA that operates based upon a first clock signal CLKA received from the clock generator 102, and the second circuit CKTB includes a second interface INTB that operates based upon a second clock signal CLKB received from the clock generator 102. Similarly, the third circuit CKTC includes a third interface INTC that operates based upon a clock signal CLKS received from the clock selector 104.

The clock generator 102 is operable to generate clock signals for the first circuit CKTA, the second circuit CKTB, and the third circuit CKTC. In a preferred embodiment of the present invention, the clock generator 102 includes a separate clock signal source for each generated clock signal. More specifically, the clock generator 102 includes a first oscillator used to generate the first clock signal CLKA, a second oscillator used to generate the second clock signal CLKB, and a third oscillator used to generate the third clock signal CLKC. As a result of using three independent sources for generating the first clock signal CLKA, the second clock signal CLKB, and the third clock signal CLKC, the clock generator 102 generates asynchronous clock signals (i.e. clock signals that are asynchronous with respect to each other and that potentially have different frequency and/or phase).

It should be appreciated that even if the first oscillator and the second oscillator generate the first clock signal CLKA and the second clock signal CLKB such that the first clock signal CLKA and the second clock signal CLKB have the same frequency (e.g. 33 MHz), the first clock signal CLKA and the second clock signal CLKB would still be asynchronous to each other. The first clock signal CLKA and the second clock signal CLKB would be asynchronous to each other because a slight frequency drift in the first clock signal CLKA would not correspond to an identical frequency drift in the second clock signal CLKB. Conversely, if the first clock signal CLKA and the second clock signal CLKB were generated from the same oscillator or signal source, then the first clock signal CLKA and the second clock signal CLKB would be synchronous because a frequency drift in the common oscillator or signal source would result in a correspond frequency drift in both the first clock signal CLKA and the second clock signal CLKB.

The clock selector 104 is operable to receive the first clock signal CLKA, the second clock signal CLKB, and the third clock signal CLKC. Moreover, the clock selector 104 is operable to apply a clock signal CLKS to the third clock circuit CLKC in response to control signals CTLSIG received from the clock selector control 106. More specifically, the clock selector 104 is operable to (i) select the clock signal CLKS from the clock signals received from the clock generator 102 based upon the control signals CTLSIG, and (ii) apply the selected clock signal CLKS to the third circuit CKTC.

In general, the clock selector control 106 controls the clock selector 104 in order to cause the clock selector 104 to apply an appropriate clock signal to the third circuit CKTC. To this end, the clock selector control 106 is operable to determine the operating state of the third circuit CKTC, and provide the clock selector 104 with control signals CTLSIG which cause the clock selector 104 to select a clock signal appropriate for the state of the third circuit CKTC. More specifically, in the embodiment depicted in FIG. 1, the clock selector control 106 is operable to cause the clock selector 104 via the control signals CTLSIG to (i) apply the first clock signal CLKA to the third circuit CKTC when the third circuit CKTC is involved in transferring signals with the first circuit CKTA, (ii) apply the second clock signal CLKB to the third circuit CKTC when the third circuit CKTC is involved in transferring signals with the second circuit CKTB, and (iii) apply the third clock signal CLKC to the third circuit CKTC when the third circuit CKTC is not involved in transferring signals with either the first circuit CKTA or the second circuit CKTB.

As a result of controlling the clock selector 104 in the above manner, the clock selector control 106 in the embodiment depicted in FIG. 1 is operable to cause the third circuit CKTC to operate at (i) the same rate as the first circuit CKTA when the third circuit CKTC is in communication with the first circuit CKTA, (ii) the same rate as the second circuit CKTB when the third circuit CKTC is in communication with the second circuit CKTB, and (iii) a normal operation rate when the third circuit CKTC is not in communication with another circuit (i.e. the first circuit CKTA or the second circuit CKTB).

Figure 2:
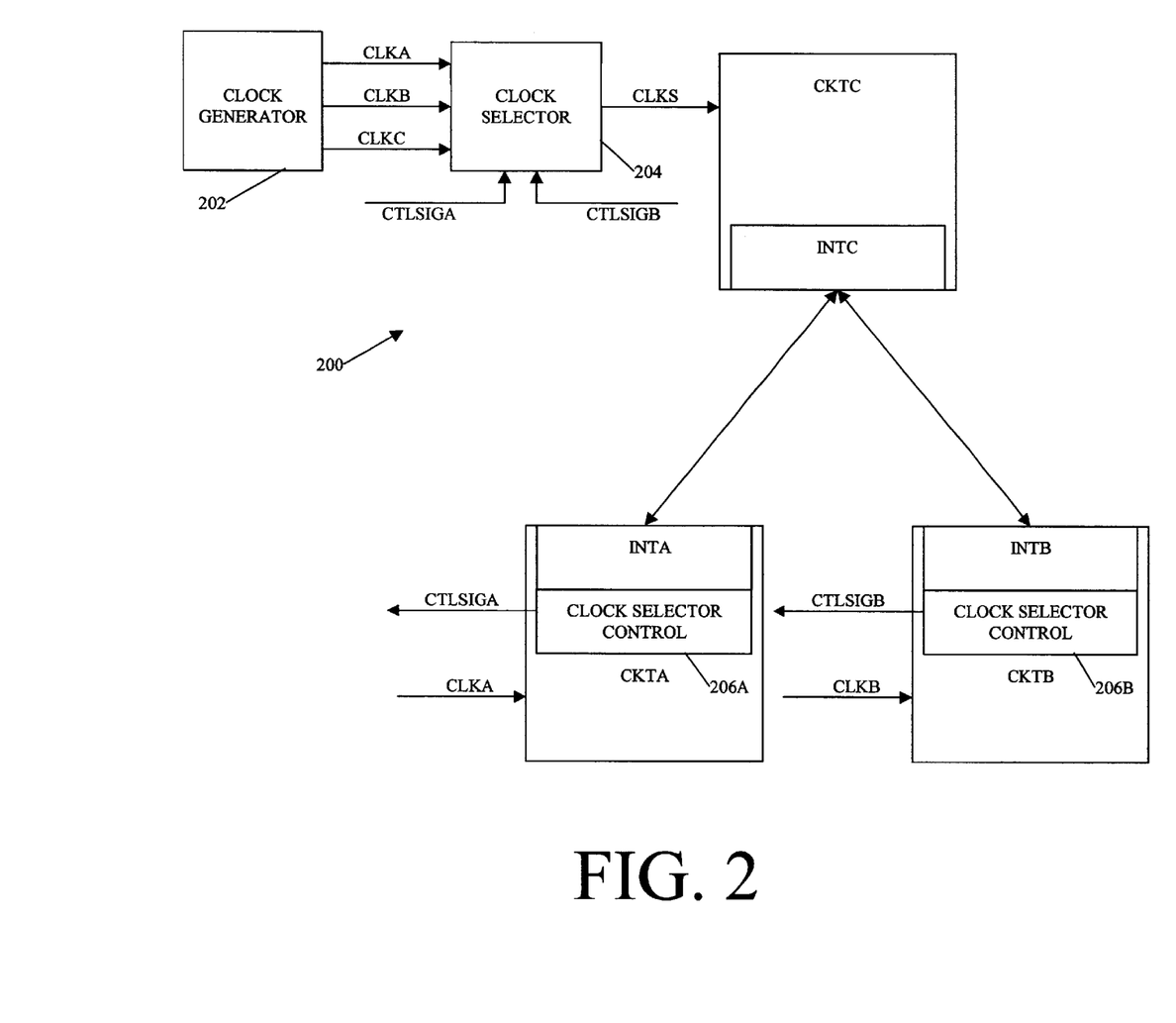
FIG. 2 shows block diagram of second interface circuitry which incorporates features of the present invention.
Figure 3:
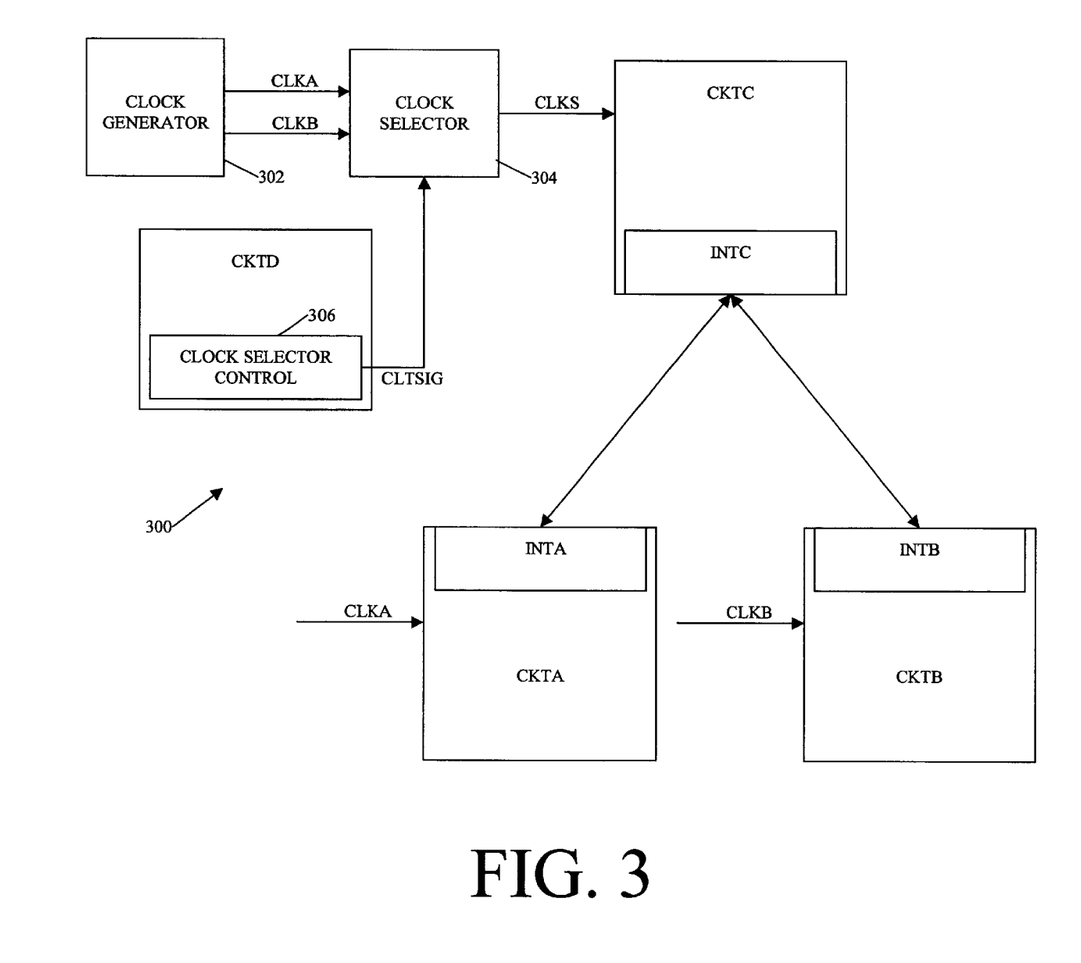
FIG. 3 shows block diagram of third interface circuitry which incorporates features of the present invention.
Figure 4:
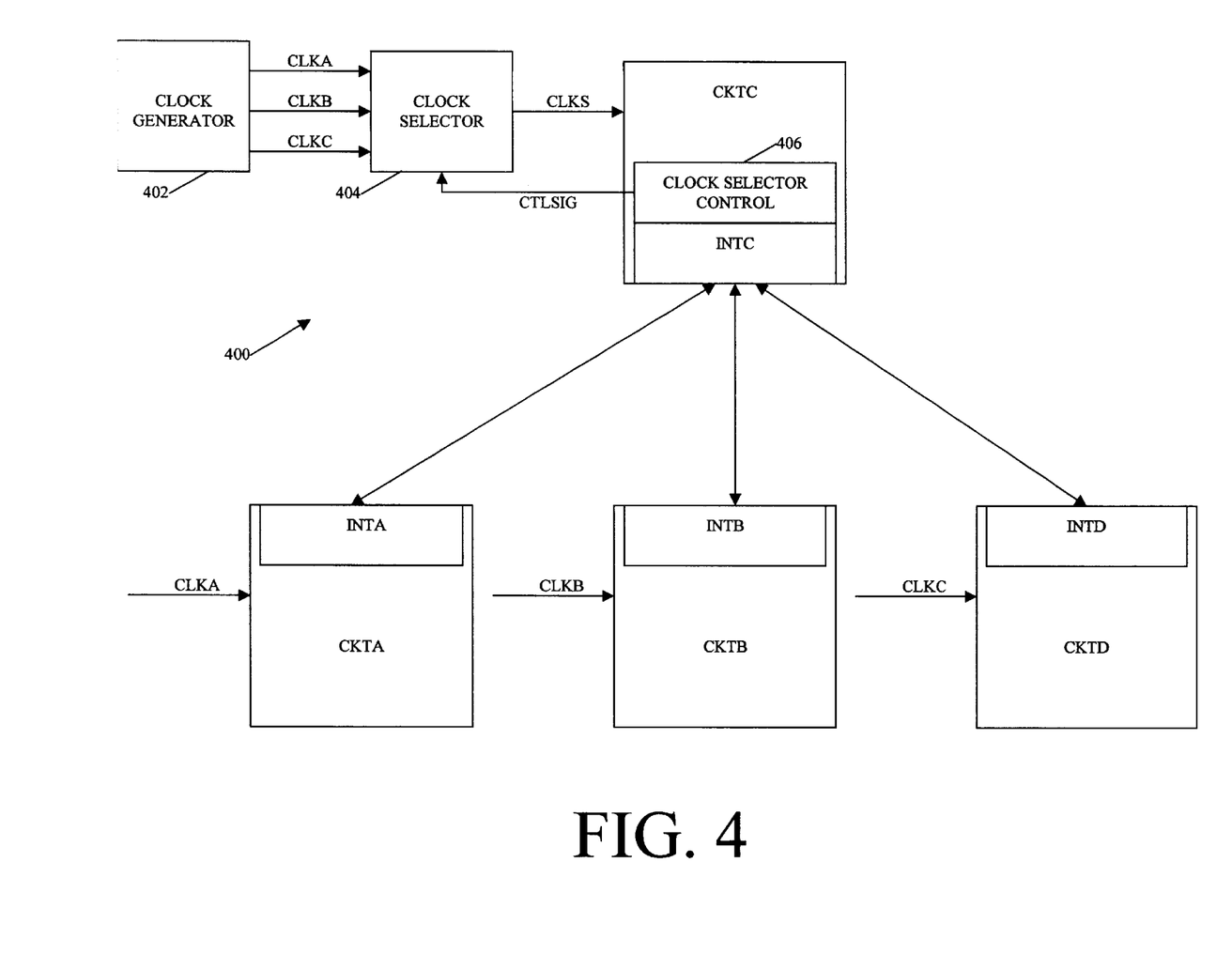
FIG. 4 shows a block diagram of fourth interface circuitry which incorporates features of the present invention.

It should be appreciated by those skilled in the art that the clock selector control 106 may be implemented in many different ways. First, the clock selector control 106 may be implemented in various different locations. For example, as depicted in FIG. 1 and FIG. 4, the clock selector control 106 is implemented as part of the third circuit CKTC. Alternatively, the clock selector control 106 may be implemented as part of the first circuit CKTA and the second circuit CKTB as illustrated in FIG. 2. Furthermore, the clock selector control 106 may be implemented separately from the first circuit CKTA, the second circuit CKTB, and the third circuit CKTC as illustrated in FIG. 3.

Second, besides differences in location of the clock selector control 106, the clock selector control 106 may be implemented with different mechanisms. For example, the clock selector control 106 may be implemented as a state machine that (i) tracks the state of the third circuit CKTC, and (ii) generates control signals CTLSIG which cause the clock selector 104 to provide the third circuit CKTC with clock signals appropriate for the state of the third circuit. Alternatively, the clock selector control 106 may be implemented to generate the appropriate control signals CTLSIG based upon control signals such as read/write control signals and chip select control signals transferred (i) between the third circuit CKTC and the first circuit CKTA, and/or (ii) between the third circuit CKTC and the second circuit CKTB. Furthermore, the clock selector control 106 may be implemented to generate the appropriate control signals CTLSIG based upon address signals indicating an address associated with the circuit (e.g. the first circuit CKTA or the second circuit CKTB) with which the third circuit CKTC is in communication. Other embodiments for implementing the clock selector control 106 should be readily apparent to those skilled in the art.

In operation, if the clock selector control 106 determines that the third circuit CKTC desires to transfer data to the first circuit CKTA or conversely that the first circuit CKTA desires to transfer data to the third circuit CKTC, then the clock selector control 106 generates first control signals CTLSIG which cause the clock selector 104 to select the first clock signal CLKA generated by the clock generator 102. As a result of selecting the first clock signal CLKA, the clock selector 104 applies the selected clock signal CLKS (i.e. the first clock signal CLKA) to the third circuit CKTC.

In response to receiving the first clock signal CLKA, the third circuit CKTC operates based upon the same first clock signal CLKA as the first circuit CKTA. Since the first circuit CKTA and the third circuit CKTC are operating based upon the same first clock signal CLKA, the first interface INTA of the first circuit CKTA and the third interface INTC of the third circuit CKTC operate at the same rate. After selecting the appropriate clock signal for the third circuit CKTC, data is transferred between the first circuit CKTA and the third circuit CKTC via the first interface INTA and the third interface INTC which are operating at the same rate.

Similarly, if the clock selector control 106 determines that the third circuit CKTC desires to transfer data to the second circuit CKTB or conversely that the second circuit CKTB desires to transfer data to the third circuit CKTC, then the clock selector control 106 generates second control signals CTLSIG which cause the clock selector 104 to select the second clock signal CLKB generated by the clock generator 102. The clock selector 104 then applies the selected clock signal CLKS (i.e. the second clock signal CLKB) to the third circuit CKTC.

The third circuit CKTC, in response to receiving the second clock signal CLKB, operates based upon the same second clock signal CLKB as the second circuit CKTB. As a result of the second circuit CKTB and the third circuit CKTC operating based upon the same second clock signal CLKB, the second interface INTB of the second circuit CKTB and the third interface INTC of the third circuit CKTC operate at the same rate. Data may then be transferred between the second circuit CKTB and the third circuit CKTC via the second interface INTB and the third interface INTC which are operating at the same rate.

Finally, if the clock selector control 106 determines that no data is to be transferred between the third circuit CKTC and the first circuit CKTA and that no data is to be transferred between the third circuit CKTC and the second circuit CKTB, then the clock selector control 106 generates third control signals CTLSIG which cause the clock selector 104 to select the third clock signal CLKC generated by the clock generator 102. The clock selector 104 then applies the selected clock signal CLKS (i.e. the third clock signal CLKC) to the third circuit CKTC thereby causing the third circuit CKTC to operate based upon the selected clock signal.

As a result of switching the clock signal applied to the third circuit CKTC in the above manner, the interfaces INTA, INTB, INTC involved in a data transfer operate at the same rate. Moreover, since the third circuit CKTC receives the same clock signal as the other circuit involved in a data transfer with the third circuit CKTC, the third interface INTC operates in synchronization with the other interface involved in the data transfer. Accordingly, the interfaces INTA, INTB, INTC need not include complicated circuitry to deal with differences in operating speeds of the circuits CKTA, CKTB, and CKTC. For example, the interfaces INTA, INTB, and INTC need not include additional circuitry that ensures against data overflow resulting (i) from receiving data at a faster rate than the receiving circuit can process the data or (ii) from transmitting data at a slower rate than the transmitting circuit is producing the data.

FIG. 2 illustrates second interface circuitry 200 which incorporates features of the present invention. The second interface circuitry 200 operates in a manner similar to the first interface circuitry 100 of FIG. 1. The main difference between the second interface circuitry 200 and the first interface circuitry 100 is the implementation of the clock selector control 106. In the first interface circuitry 100 of FIG. 1, the third circuit CKTC included the clock selector control 106; however, in the second interface circuitry 200 of FIG. 2, the first circuit CKTA includes a first portion 206A of the clock selector control and the second circuit CKTB includes a second portion 206B of the clock selector control.

In this embodiment, the first portion 206A of the clock selector control is operable to generate first control signals CTLSIGA which indicate that a data transfer is to occur between the first circuit CKTA and the third circuit CKTC. Similarly, the second portion 206B of the clock selector control is operable to generate second control signals CTLSIGB that indicate that a data transfer is to occur between the second circuit CKTB and the third circuit CKTC.

The clock selector 204 of the second interface circuitry 200 is operable to apply a clock signal to the third circuit CKTC based upon first control signals CTLSIGA and second control signals CTLSIGB. In particular, the clock selector 204 is operable to apply a first clock signal CLKA generated by a clock generator 202 of the second interface circuitry 200 in response to the first control signals CTLSIGA indicating that a data transfer is to occur between the first circuit CKTA and the third circuit CKTC. Similarly, the clock selector 204 is operable to apply a second clock signal CLKB generated by the clock generator 202 in response to the second control signals CTLSIGB indicating that a data transfer is to occur between the second circuit CKTB and the third circuit CKTC. Moreover, the clock selector 204 is operable to apply a third clock signal CLKC generated by the clock generator 202 in response to (i) the first control signals CTLSIGA indicating that no data transfer is to occur between the first circuit CKTA and the third circuit CKTC, and (ii) the second control signals CTLSIGB indicating that no data transfer is to occur between the second circuit CKTB and the third circuit CKTC.

FIG. 3 illustrates third interface circuitry 300 which incorporates features of the present invention. The third interface circuitry 300 operates in a manner similar to the first interface circuitry 100 of FIG. 1. The main differences between the third interface circuitry 300 and the first interface circuitry 100 is (i) the implementation of the clock selector control 106, and (ii) the lack of a separate clock signal for the third circuit CKTC. In the first interface circuitry 100 of FIG. 1, the third circuit CKTC included the clock selector control 106; however, in the third interface circuitry 300 of FIG. 3, the clock selector control 306 is implemented in a fourth circuit CKTD that is separate and distinct from the first circuit CKTA, the second circuit CKTB, and the third circuit CKTC.

In this embodiment, the clock selector control 306 is operable to (i) determine whether a data transfer is to occur between the first circuit CKTA and the third circuit CKTC, and (ii) generate control signals CTLSIG that indicate a data transfer is to occur between the first circuit CKTA and the third circuit CKTC in response to making such a determination. In a preferred embodiment, the fourth circuit CKTD is operable to control the overall operation of the first circuit CKTA, the second circuit CKTB, and the third circuit CKTC in a master/slave type relationship. In this embodiment, the fourth circuit CKTD, in configuring the third circuit CKTC for a data transfer with said first circuit CKTA, generates the control signals CTLSIG to indicate that a data transfer is to occur between the third circuit CKTC and the first circuit CKTA.

The clock selector 304 of the second interface circuitry 300 is operable to apply a clock signal to the third circuit CKTC based upon the control signals CTLSIG received from the clock select control 306. In particular, the clock selector 304 is operable to apply a first clock signal CLKA generated by a clock generator 302 of the third interface circuitry 300 in response to the control signals CTLSIG indicating that a data transfer is to occur between the first circuit CKTA and the third circuit CKTC. Moreover, the clock selector 304 is operable to apply a second clock signal CLKB generated by the clock generator 202 to the third circuit CLKC in response to the control signals CTLSIG indicating that no data transfer is to occur between the first circuit CKTA and the third circuit CKTC.

During operation of the third interface circuitry 300, the fourth circuit CKTD configures the third circuit CKTC and the first circuit CKTA for a data transfer. To this end, the fourth circuit CKTD via the clock selector control 306 configures the third circuit CKTC to operate based upon the first clock signal CLKA. More specifically, the clock selector control 306 of the fourth circuit CKTD generates control signals CTLSIG that indicate that a data transfer is to occur between the first circuit CKTA and the third circuit CKTC. As a result of receiving the above control signals CTLSIG, the clock selector 304 applies the first clock signal CLKA to the third circuit CKTC. Since as illustrated in FIG. 3 the first circuit CKTA also operates based upon the first clock signal CLKA, the above configuring causes the third circuit CKTC to operate based upon the same clock signal CLKA as the first circuit CKTA thereby causing the third interface INTC of the third circuit CKTC and the first interface INTA of the first circuit CKTA to operate at the same rate. Accordingly, after the above configuration of the third circuit CKTC, data may be transferred between the third circuit CKTC and the first circuit CKTA at a rate based upon the first clock signal CLKA.

If no data is to be transferred between the first circuit CKTA and the third circuit CKTC, the fourth circuit CKTD via the clock selector control 306 causes the third circuit CKTC to operate based upon the second clock signal CLKB. More specifically, the clock selector control 306 of the fourth circuit CKTD generates control signals CTLSIG that indicate that no data transfer is to occur between the first circuit CKTA and the third circuit CKTC. As a result of receiving the above control signals CTLSIG, the clock selector 304 applies the second clock signal CLKB to the third circuit CKTC. Since as illustrated in FIG. 3 the second circuit CKTB also operates based upon the second clock signal CLKB, the above configuration of the third circuit CKTC causes the third circuit CKTC to operate based upon the same clock signal CLKB as the second circuit CKTB during periods in which the third circuit CKTC is not communicating with the first circuit CKTA thereby causing the third interface INTC of the third circuit CKTC and the second interface INTB of the second CKTB to operate at the same rate when data is transferred between the second circuit CKTB and the third circuit CKTC. Accordingly, after the configuring the third circuit CKTC to operate based upon the second clock signal CLKB, data may be transferred between the third circuit CKTC and the second circuit CKTB at a rate based upon the second clock signal CLKB.

Referring now to FIG. 4, there is illustrated fourth interface circuitry 400 which incorporates features of the present invention. The fourth interface circuitry 400 operates in a manner similar to the first interface circuitry 100 of FIG. 1. The fourth interface circuit 400 depicted in FIG. 4 essentially illustrates (i) that the interface circuitry of the present invention may be used to interface the third circuit CKTC with more than two circuits, and (ii) that a separate clock signal for the third circuit CKTC during periods of no data transfer is not necessary.

During operation of the fourth interface circuitry 400, if the clock selector control 406 determines that a data transfer is to occur between the first circuit CKTA and the third circuit CKTC, then the clock selector control 406 causes the third circuit CKTC to operate based upon the same clock signal CLKA as the first circuit CKTA. Similarly, if the clock selector control 406 determines that a data transfer is to occur between the second circuit CKTB and the third circuit CKTC, then the clock selector control 406 causes the third circuit CKTC to operate based upon the same clock signal CLKB as the second circuit CKTB. However, if the clock selector control 406 determines that third circuit CKTC is not involved in a data transfer with the first circuit CKTA or the second circuit CKTB, then the clock selector control 406 causes the third circuit CKTC to operate based upon the third clock signal CLKC. Since the fourth circuit CKTD also operates based upon the third clock signal CLKC, data transfers between the fourth circuit CKTD and the third circuit CKTC occur at a rate based upon the third clock signal CLKC.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of interfacing a first circuit that operates based upon a first clock signal and a second circuit that operates based upon a second clock signal with a third circuit, comprising the steps of:

a) transferring first signals between said third circuit and said first circuit;

b) operating said third circuit based upon said first clock signal during step (a);

c) transferring second signals between said third circuit and said second circuit; and d) operating said third circuit based upon said second clock signal during step (c).

2. The method of claim 1, further comprising the steps of:

e) determining whether said first signals are to be transferred between said third circuit and said first circuit;

f) determining whether said second signals are to be transferred between said third circuit and said second circuit;

g) performing step (a) and step (b) in response to step (e) determining that said first signals are to be transferred between said third circuit and said first circuit; and h) performing step (c) and step (d) in response to step (f) determining that said first signals are to be transferred between said third circuit and said second circuit.

3. The method of claim 1, further comprising the steps of:

e) determining whether said first signals are to be transferred between said third circuit and said first circuit;

f) determining whether said second signals are to be transferred between said third circuit and said second circuit, wherein step (b) includes the step of applying said first clock signal to said third circuit in response to step (e) determining that said first signals are to be transferred between said third circuit and said first circuit, and step (d) includes the step of applying said second clock signal to said third circuit in response to step (f)

determining that said second signals are to be transferred between said third circuit and said second circuit.

4. The method of claim 1, wherein:

step (b) includes the step of applying said first clock signal to said third circuit in order to cause said third circuit to operate synchronously with respect to said first circuit, and step (d) includes the step of applying said second clock signal to said third circuit in order to cause said third circuit to operate synchronously with respect to said second circuit.

5. The method of claim 1, wherein:

step (b) includes the step of applying said first clock signal to said third circuit in order to cause said third circuit to operate synchronously with respect to said first circuit and asynchronously with respect to said second circuit, and step (d) includes the step of applying said second clock signal to said third circuit in order to cause said third circuit to operate synchronously with respect to said second circuit and asynchronously with respect to said first circuit.

6. The method of claim 1, wherein:

step (a) includes the step of transferring said first signals between said third circuit and said first circuit at a first rate that is based upon said first clock signal; and step (c) includes the step of transferring said second signals between said third circuit and said second circuit at a second rate that is based upon said second clock signal.

7. A method of interfacing a first circuit that operates based upon a first clock signal and a second circuit that operates based upon a second clock signal with a third circuit, comprising the steps of:

a) applying said first clock signal and said second clock signal to a clock selector for said third circuit;

b) transferring first data signals between said third circuit and said first circuit at a first rate based upon said first clock signal;

c) causing said clock selector to apply said first clock signal to said third circuit prior to step (b);

d) transferring second data signals between said third circuit and said second circuit at a second rate based upon said second clock signal; and e) causing said clock selector to apply said second clock signal to said third circuit prior to step (d).

8. The method of claim 7, further comprising the step of:

f) determining whether said third circuit is to be involved in a first data transfer with said first circuit;

g) determining whether said third circuit is to be involved in a second data transfer with said second circuit;

h) performing step (b) and step (c) in response to step (f) determining that said third circuit is to be involved in said first data transfer with said first circuit; and i) performing step (d) and step (e) in response to step (g) determining that said third circuit is to be involved in said second data transfer with said second circuit.

9. The method of claim 7, wherein:

step (c) includes the step of operating said third circuit synchronously with respect to said first circuit in response to applying said first clock signal to said third circuit, and step (e) includes the step of operating said third circuit synchronously with respect to said second in response to applying said second clock signal to said third circuit.

10. The method of claim 7, wherein:

step (c) includes the steps of (c)(1) operating said third circuit synchronously with respect to said first circuit in response to applying said first clock signal to said third circuit, and (c)(2) operating said third circuit asynchronously with respect to said second circuit in response to applying said first clock signal to said third circuit, and step (e) includes the step of (e)(1) operating said third circuit synchronously with respect to said second circuit in response to applying said second clock signal to said third circuit, and (e)(2) operating said third circuit asynchronously with respect to said first circuit in response to applying said second clock signal to said third circuit.

11. An apparatus for interfacing a first circuit operating at a first rate based upon a first clock signal and a second circuit operating at a second rate based upon a second clock signal with a third circuit that is configured to operate at (i) said first rate in response to receiving said first clock signal, and (ii) said second rate in response to receiving said second clock signal, comprising:

a clock selector operable to (i) receive said first clock signal, said second clock signal, first control signals, and second control signals, (ii) apply said first clock signal to said third circuit in response to said first control signals in order to cause said third circuit to operate at said first rate, and (iii) apply said second clock signal to said third circuit in response to said second control signals in order to cause said third circuit to operate at said second rate; and a clock selector control coupled to said clock selector, said clock selector control operable to (i) generate said first control signals prior to a first data transfer between said third circuit and said first circuit, and (ii) generate said second control signals prior to a second data transfer between said third circuit and said second circuit.

12. The apparatus of claim 11, wherein:

said clock selector control is included in said third circuit.

13. The apparatus of claim 11, wherein:

said clock selector control comprises a first portion that generates said first control signals, and a second portion that generates said second control signals, and said first portion of said clock selector is included in said first circuit, and said second portion of said clock selector is included in said second circuit.

14. The apparatus of claim 11, wherein:

said clock selector is further operable to (iv) receive a third clock signal, and (v) apply said third clock signal to said third circuit in response to third control signals, and said clock selector control is further operable to generate said third control signals during periods which said third circuit is not involved in (a) said first data transfers with said first circuit and (b) said second data transfers with said second circuit.

15. The apparatus of claim 11, further comprising:

a fourth circuit comprising said clock selector control and coupled to said first circuit, said second circuit, and said third circuit, said fourth circuit operable to control operation of said first circuit, said second circuit, and said third circuit.

16. A system, comprising:

a first clock source operable to generate a first clock signal;

a second clock source operable to generate a second clock signal;

a first circuit coupled to said first clock source in order to receive said first clock signal, said first circuit configured to operate at a first rate based upon said first clock signal;

a second circuit coupled to said second clock source in order to receive said second clock signal, said second circuit configured to operate at a second rate that is based upon said second clock signal;

a third circuit coupled to said first circuit and said second circuit, said third circuit configured to (i) operate at said first rate in response to receiving said first clock signal, and (ii) operate at said second rata in response to receiving said second clock signal;

a clock selector coupled to (i) said first clock source in order to receive said first clock signal, and (ii) said second clock source in order to receive said second clock signal, said clock selector operable to (i) apply said first clock signal to said third circuit in response to first control signals in order to cause said third circuit to operate at said first rate, and (ii) apply said second clock signal to said third circuit in response to second control signals in order to cause said third circuit to operate at said second rate; and a clock selector control coupled to said clock selector, said clock selector control operable to (i) generate said first control signals prior to a first data transfer between said third circuit and said first circuit, and (ii) generate said second control signals prior to a second data transfer between said third circuit and said second circuit.

17. The system of claim 16, wherein:

said first clock source and said second clock source are further operable to respectively generate said first clock signal and said second clock signal such that said first clock signal is asynchronous with respect to said second clock signal.

18. The system of claim 16, wherein:

said third circuit is further operable to (iii) operate synchronously with said first circuit in response to receiving said first clock signal, and (iv) operate synchronously with said second circuit in response to receiving said second clock signal.

19. The system of claim 16, further comprising a fourth circuit coupled to said first clock source in order to receive said first clock signal, wherein:

said fourth circuit is configured to operate at said first rate in response to receiving said first clock signal, said third circuit is further coupled to said fourth circuit, and said clock selector is further operable to generate said first control signals prior to a third data transfer between said third circuit and said fourth circuit.

20. The system of claim 16, further comprising a third clock source operable to generate a third clock signal, and a fourth circuit coupled to said third clock source in order to receive said third clock signal, wherein:

said fourth circuit is configured to operate at a third rate that is based upon said third clock signal, said third circuit is further coupled to said fourth circuit and is further configured to operate at said third rate in response to receiving said third clock signal, said clock selector is further coupled to said third clock source in order to receive said third clock signal and is further operable to apply said third clock signal to said third circuit in response to third control signals in order to cause said third circuit to operate at said third rate, and said clock selector control is further operable to generate said third control signals prior to a third data transfer between said third circuit and said fourth circuit.

* * * * *